United States Patent [19]
Shimizu et al.

[11] Patent Number: 5,689,486
[45] Date of Patent: Nov. 18, 1997

[54] OPTICAL DISC REPRODUCING APPARATUS

[75] Inventors: Kenji Shimizu; Manabu Bessho, both of Tokorozawa, Japan

[73] Assignee: Pioneer Electronic Corporation, Tokyo, Japan

[21] Appl. No.: 736,100

[22] Filed: Oct. 24, 1996

[30] Foreign Application Priority Data

Oct. 30, 1995 [JP] Japan .................... 7-306842

[51] Int. Cl.$^6$ ............................ G11B 00/00
[52] U.S. Cl. ............................ 369/59; 369/124
[58] Field of Search ............ 392/32, 60, 59, 392/124, 47

[56] References Cited

U.S. PATENT DOCUMENTS

| | | | |
|---|---|---|---|
| 4,290,122 | 9/1981 | Bates et al. ........................ | 369/59 |
| 5,225,755 | 7/1993 | Okamoto ........................ | 369/44.29 |

*Primary Examiner*—Nabil Hindi
*Attorney, Agent, or Firm*—Keck, Mahin & Cate

[57] ABSTRACT

An optical disc reproducing apparatus reproduces different encoded audio signals from a first optical disc carrying recorded first audio data which is previously digitally converted by a non-compression-encoding and a second optical disc carrying recorded second audio data which is previously digitally converted by a compression-encoding. The optical disc reproducing apparatus has: extracting circuit for extracting the first and second audio data; identifying circuit for identifying the optical disc; converting circuit for converting the second audio data to digital data obtained by the non-compression-encoding; designating circuit for designating compression-encoded data in order to transmit; relay circuit for selectively relaying and generating outputs of the extracting circuit and converting circuit in accordance with an identification signal; circuit for converting the digital data which is generated from the relay circuit to self-synchronous type data; and an output terminal for generating the self-synchronous type data to an external apparatus. When there is a designation from the designating circuit, the relay circuit forcedly relays the output of the extracting circuit.

1 Claim, 3 Drawing Sheets

OPTICAL DISC REPRODUCING APPARATUS

BACKGROUND OF THE INVENTION

1. Field of the Invention

The present invention relates to an optical disc data reproducing apparatus having a capability of reproducing different encoded audio signals recorded in a plurality of kinds of optical discs.

2. Description of the Related Art

There is well known an audio system comprising a CD player including a digital I/F (Interface) encoding circuit connected to a subsequent unit such as an amplifier including a demodulator. In this case, a non-compression-encoded linear PCM signal read out from a CD (Compact Disc) is transferred to the digital I/F encoding circuit which converts the PCM signal to self-synchronous type data as digital which is suitable for a data transmission by using a modulating method such as a bi-phase modulation or the like to reduce a deterioration of transferred signal, and then the self-synchronous type digital data is transferred to the demodulator of the amplifier which demodulates the data to the linear PCM signal. This demodulated digital signal is converted to an analog signal in the amplifier, and after that, a speaker connected to the amplifier is driven according to the analog signal.

Whereas in recent years there is a demand to realize a high sound quality for the reproduced music. For this, DVD (Digital Video Disc) paid attentions as an optical disc medium in recent years may be allowed to employ a recording format for encoding a high quality audio signal to a multi-channel digital encode at a high efficiency (data-compression-encoding).

Since the CD and DVD are the same optical discs and have the same fundamental reading principle, it will be expected to realize a reproducing apparatus which can reproduce different data from both of those optical discs. In case that such a compatible reproducing apparatus is connected to the conventional subsequent unit such as an amplifier which has already been widespread into the world, the subsequent unit can not have any identifying means for identifying the kind of encoding of data to be transmitted, it preforms the decoding process in which all of the data to be transmitted thereto is processed as the linear PCM signal regardless of data format. When the compression-encoded data signal is transmitted to the subsequent unit, therefore, a proper decoding process is not performed in the subsequent unit, so that there is a problem such that the signal causes noises.

SUMMARY OF THE INVENTION

It is, therefore, an object of the present invention to provide an optical disc reproducing apparatus such that, when an output terminal structure (the digital I/F encoding circuit and an output terminal) of a digital audio signal necessary for a digital transmission is commonly used, even the subsequent unit such as an existing amplifier or the like which cannot cope with a compression-encoded audio signal can be connected without inconvenience.

According to the invention, there is provided an optical disc reproducing apparatus having a capability of reproducing different encoded audio signals from a first optical disc carrying recorded first audio data which is previously digitally converted by a non-compression-encoding and a second optical disc carrying recorded second audio data which is previously digitally converted by a compression-encoding, comprising: data extracting means for extracting the first and second audio data; disc identifying means for identifying each of the optical discs and generating an identification signal (referred to as an ID signal, hereinbelow); coding-converting means for converting the second audio data extracted by the data extracting means to digital data obtained by the non-compression-encoding; transmission data designating means for designating digital data to be transmitted to digital data obtained by the compression-encoding; relay means for selectively relaying and generating an output of the data extracting means and an output of the coding-converting means; synchronized data converting means for converting the digital data which is generated from the relay means to self-synchronous type data; and an output terminal to generate the synchronized data to an external apparatus, wherein when the disc ID signal indicates the second optical disc and there is a designation from the designating means, the relay means forcedly relays and generates the output of the data extracting means. When such a compatible reproducing apparatus is considered in circumstances of the miniaturization of the apparatus, the use of a conventional subsequent unit to be connected, and the easiness of connection thereto, the reproducing apparatus is convenient which is provided with only one output terminal structure performing a digital transmission which can be commonly used for the reproductions of both the CD and DVD. Since different encoding methods are used in the CD and DVD for reproducing audio signals, when the output terminal structure is commonly used, it is necessary that a subsequent unit such as an amplifier or the like has means for identifying the kind of encoding of data to be transmitted.

According to the present invention, the recorded first audio data of the first optical disc digitally converted by the non-compression-encoding and the recorded second audio data of the second optical disc digitally converted by the compression-encoding are extracted by the extracting means. The second audio data is converted to the non-compression-encoded data by the coding-converting means. The relay means selectively relays and generates the output from the extracting means and the output from the data coding-converting means to the synchronized data converting means in accordance with the ID signal of the disc identifying means. When the ID signal identifies the second disc and the output designating means designates the compression-encoded digital data, the output of the extracting means is forcedly relayed and generated.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

The above set forth and other features of the invention are made more apparent in the ensuing Detailed Description of the Invention when read in conjunction with the attached Drawings.

DETAILED DESCRIPTION OF THE PREFERRED EMBODIMENT

Figure 1:
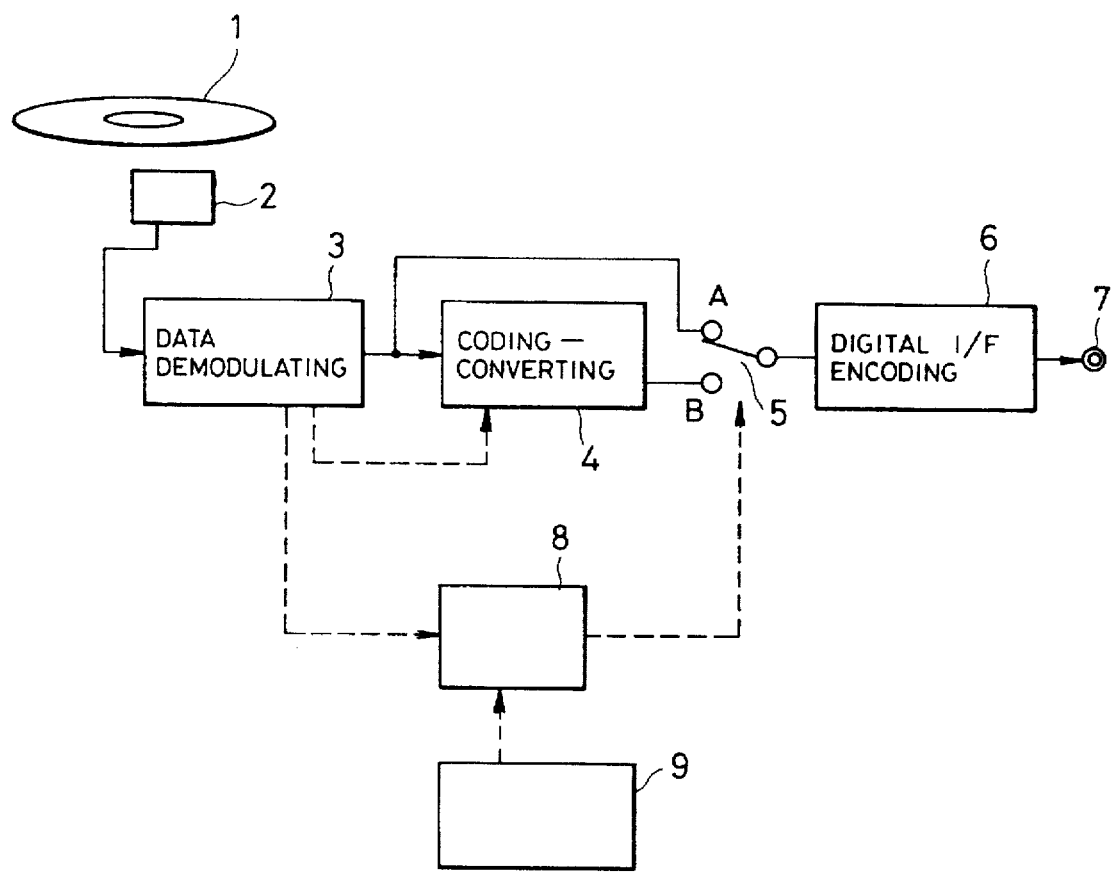
FIG. 1 is a block diagram of an optical disc reproducing apparatus of an embodiment of the invention.

In FIG. 1, reference numeral 1 denotes an optical disc to be reproduced; 2 an optical pickup; 3 a data demodulating circuit for extracting audio data which has been recorded on the optical disc 1 by a predetermined recording modulation and for performing a predetermined demodulating process such as an error correction or the like; 4 a coding-converting circuit for converting compressed and encoded audio data (hereinbelow, referred to as compression-encoded data) which has been recorded on a DVD to the same non-compressed and encoded data as non-compressed and encoded audio data (hereinbelow, referred to as non-compression-encoded data) to be recorded on a CD; 5 a switch for selectively relaying and supplying output data of the demodulating circuit 3 and output data of the coding-converting circuit 4 in accordance with a control signal, which will be explained hereinlater; 6 a digital I/F encoding circuit for converting the supplied data to self-synchronous type encoded data such as a bi-phase code or the like which is suitable for serially transmitting; 7 an output terminal; 8 a system controller including a CPU; and 9 input keys constructed by a ten-key, selection buttons and the like.

In this apparatus, the loaded optical disc 1 is driven by a spindle motor (not shown), and the data recorded on the disc 1 is read out by the optical pickup 2 in a carriage (not shown). The pickup is supported by the carriage which travels in the radial direction of the disc 1 by a carriage motor (not shown), so that a data read point (corresponding to an optical spot for reading data on the disc) of the pickup can be freely positioned in the radial direction of the disc. The apparatus further has various servo systems (not shown) including a spindle servo system, focus servo system, tracking servo system and carriage servo system.

The spindle motor and the carriage motor are driven by the spindle servo system and the carriage servo system, respectively or by driving controller. The driving controller is designed to drive the spindle motor and the carriage motor, and controls the ON/OFF operation of the various servo systems in accordance with commands from the system controller.

A recorded signal on the optical disc 1 by a predetermined modulating method such as an EFM or the like is read out by the optical pickup 2 and is supplied to the data demodulating circuit 3. The data demodulating circuit 3 performs a demodulating process, an error correction and the like to the read-out recording signal. When the optical disc 1 is a CD, the circuit 3 extracts the non-compression-encoded data and, in case of a DVD, extracts the compression-encoded data. Each of the extracted encoded data is supplied to one fixed terminal "A" of the switch 5 as relaying means to the encoding circuit 6 and is also supplied to the coding-converting circuit 4. The data demodulating circuit 3 extracts a disc ID signal and audio ID signal recorded on the optical disc 1 and supplies them to the CPU 8 and coding-converting circuit 4. When the disc ID signal which is supplied from the data demodulating circuit 3 indicates that the optical disc which is being reproduced at present is the DVD, the coding-converting circuit 4 converts the compression-encoded data recorded on the DVD to the same encoded data as the non-compression-encoded data to be recorded on the CD and supplies to another fixed terminal "B" of the switch 5. The switch 5 selectively relays the encoded data which is supplied to the fixed terminals "A" and "B" in order to supply to the digital I/F encoding circuit 6 in accordance with a control signal, which will be described hereinafter, from the CPU 8. The digital I/F encoding circuit 6 encodes the supplied encoded data to data of a self-synchronous type such as a bi-phase code which is suitable for serially transmitting and in which self-clock components are included in the data to be transmitted and supplies it to the output terminal 7 for transmitting to an external unit such as an amplifier (not shown) or the like. The CPU 8 forms a control signal for the switching operation of the switch 5 on the basis of the disc ID signal and audio information which are supplied from the data demodulating circuit 3 and designation information of the output data which is supplied from the input keys 9 to the external unit.

Figure 2:
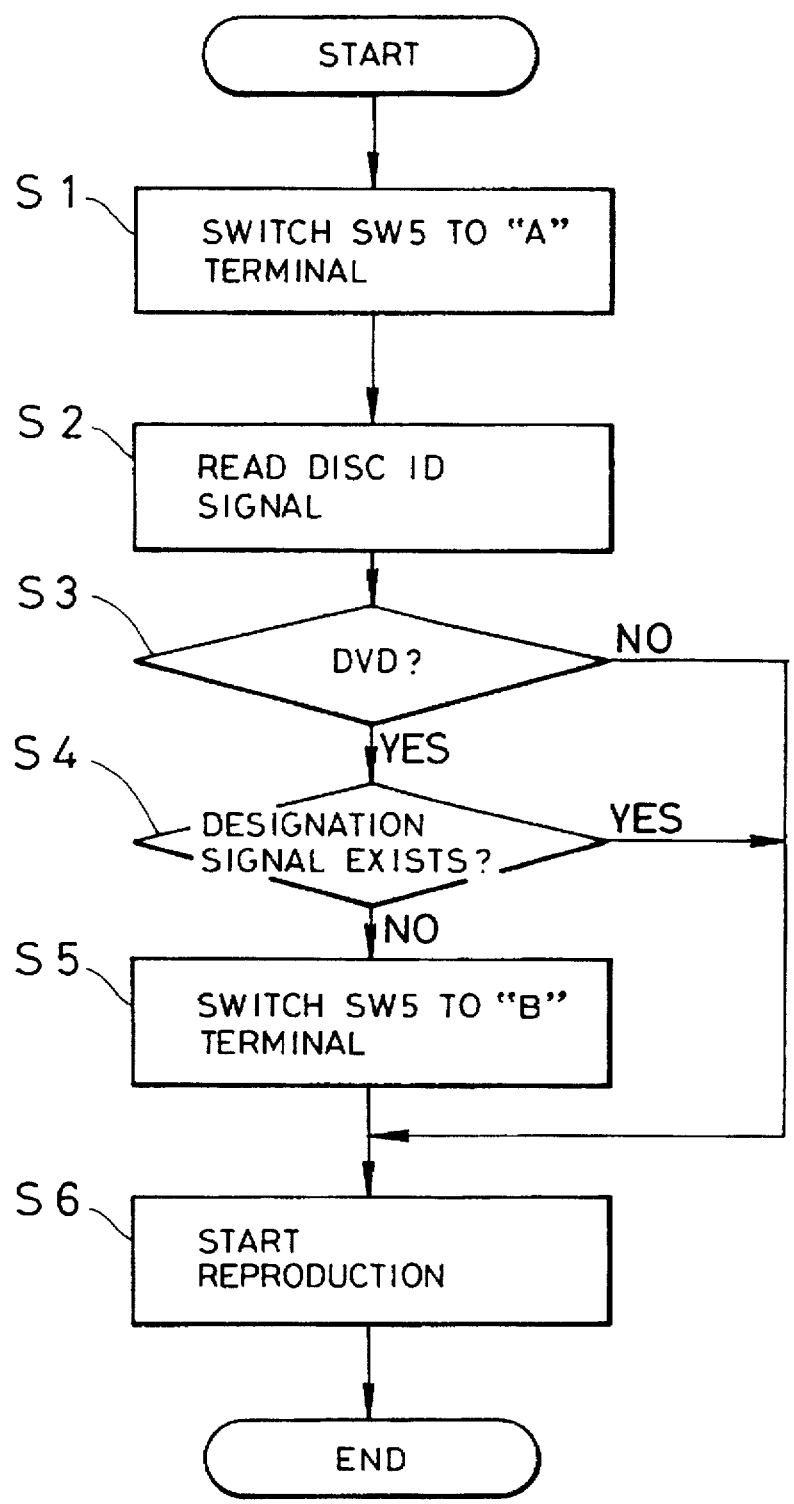
FIG. 2 is a flowchart showing the operation of a CPU 8 for controlling the switching operation of a switch 5 in the block diagram of FIG. 1.

The processing operation of an audio signal in the optical disc reproducing apparatus of the embodiment will now be described in detail with reference to FIG. 2. It is assumed that a target disc to be reproduced is put at a reproducing position and reproduction preparing operations such as spindle control, focusing control, tracking control, and the like have already been performed.

In a state in which the reproduction preparing operations have been performed, the CPU 8 generates the control signal for setting the switching position of the switch 5 to the fixed terminal "A" side (step S1). The disc ID signal which is supplied from the data demodulating circuit 3 is read out (step S2). When the kind of disc indicates a CD, step S6 follows and a performance is started as it is. Since the switch 5 is connected to the fixed terminal "A", a linear PCM signal as non-compression data extracted from the CD is supplied to the encoding circuit 6 simultaneously with the start of the performance and self-synchronized serial data is generated from the output terminal 7 to the external unit.

In case of indicating the DVD, step S4 follows (step S3). In step S4, it is judged whether a designation signal for designating that the encoded data to be generated to an external apparatus is set to compression data has been supplied from the input keys 9 or not. If NO (NO in step S4), step S5 follows and a control signal for switching the switch 5 to the fixed terminal "B" side is generated in order to generate the non-compression-encoded data to the external unit. The processing routine subsequently advances to step S6, thereby starting the performance. Since the switch 5 is connected to the fixed terminal "B", the audio data obtained by converting the compression data extracted from the DVD to the same linear PCM signal as the signal of the CD is supplied from the coding-converting circuit to the encoding circuit 6 simultaneously with the start of the performance. The serial data obtained by self-synchronizing the non-compressed encoded data is generated from the output terminal 7 to the external apparatus. As mentioned above, when there is no designation signal to be supplied from the input key 9, the switch 5 is controlled so as to alternately select either one of the fixed terminals "A" and "B" in accordance with the performance of the CD and DVD. The serial data, therefore, obtained by self-synchronizing the non-compression-encoded data is always supplied from the output terminal 7.

When it is judged that the designation signal has been supplied in step S4 (YES in step S4), step S6 follows. That is, since the switching control operation of the switch 5 to the fixed terminal "B" in step S5 is not executed, the compression-encoded data is supplied to the encoding circuit and the serial data obtained by self-synchronizing the compression-encoded data is generated from the output terminal 7. As mentioned above, ordinarily, in case of the CD, the fixed terminal "A" is selected and, in case of the DVD, the fixed terminal "B" is selected. Even in case of the DVD, however, when there is the designation signal, the fixed terminal "A" of the switch is forcedly selected. Irrespective of the presence or absence of the decoding processing function of the compression-encoded data in the subsequent unit, therefore, the subsequent unit can be connected to the single output terminal 7.

Figure 3:
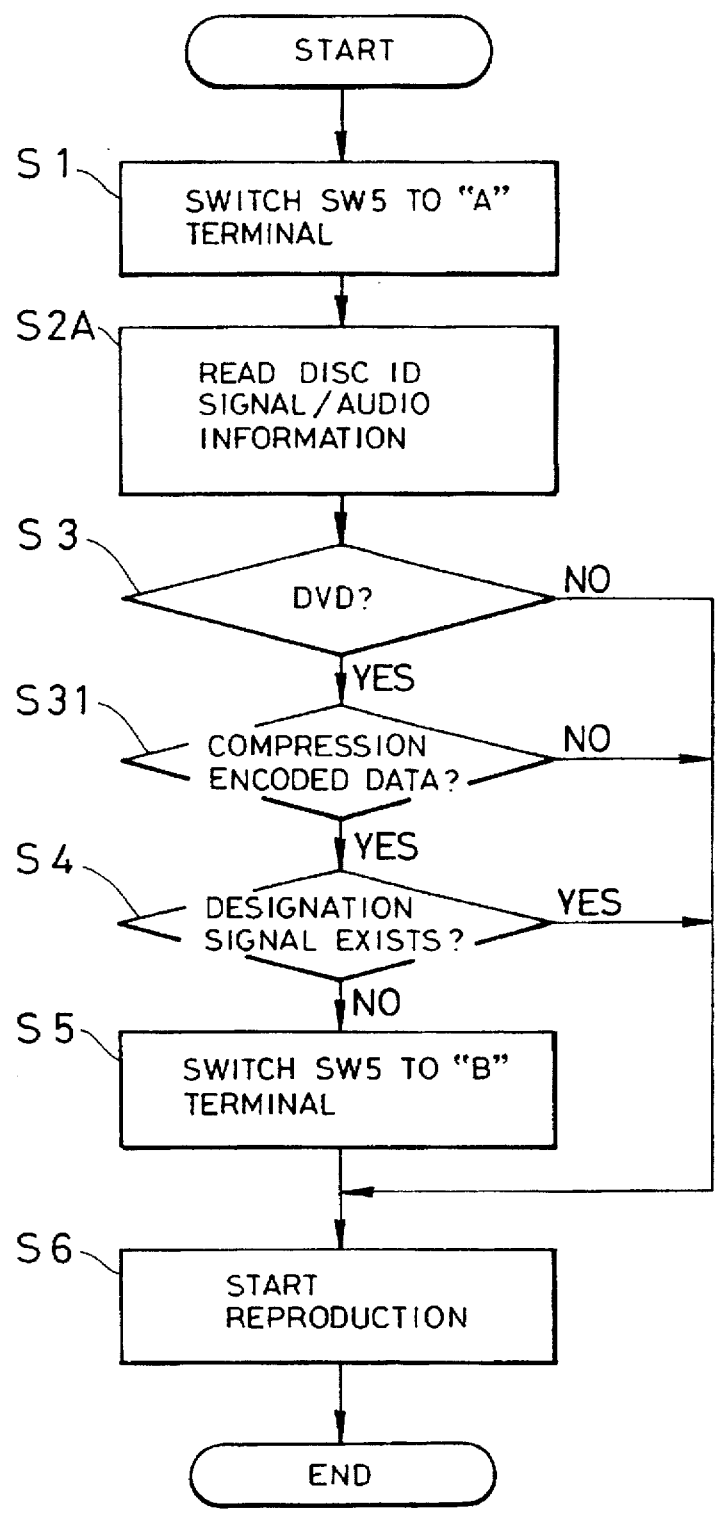
FIG. 3 is a flowchart showing the operation of the CPU 8 for controlling the switching operation of the switch 5 when a plurality of encoded audio data have mixedly been recorded to a DVD.

When a plurality of encoded audio data are mixedly recorded to the DVD, as shown in FIG. 3, it is sufficient to control in a manner such that audio information indicative of the kind of audio data is read out from the DVD in step S2A, whether the audio data which is being reproduced at present is the non-compression-encoded data or the compression-encoded data is judged on the basis of the read-out audio information in step S31, and in case of the non-compression-encoded data, step S6 follows and, in case of the compression-encoded data, step S5 follows.

As described above, according to the invention, ordinarily, the fixed terminal "A" is selected in case of the CD and the fixed terminal "B" is selected in case of the DVD. Even in case of the DVD, however, when the designation signal exists, since the fixed terminal "A" of the switch is forcedly selected, the subsequent unit can be connected irrespective of the presence or absence of the decoding processing function of the compression-encoded data and a construction of the single output terminal can be used. That is, even when the subsequent unit having the decoding processing function is connected or when the subsequent unit without the decoding processing function is connected, the output terminal structure for the digital transmission can be commonly used. It is particularly convenient, therefore, when the miniaturization of the reproducing apparatus or easiness of the connection with the subsequent unit has to be considered.

What is claimed is:

1. An optical disc reproducing apparatus having a capability of reproducing different encoded audio signals from a first optical disc carrying recorded first audio data which is previously digitally converted by a non-compression-encoding and a second optical disc carrying recorded second audio data which is previously digitally converted by a compression-encoding, comprising:

data extracting means for extracting said first audio data from said first optical disc and extracting said second audio data from said second optical disc;

disc identifying means for identifying said first and second optical discs and generating an identification signal;

coding-converting means for converting said second audio data extracted by said data extracting means to digital data by the non-compression-encoding;

transmission data designating means for designating digital data to be transmitted to digital data by the compression-encoding;

relay means for selectively relaying and generating an output of said data extracting means and an output of said coding-converting means in accordance with said identification signal;

synchronized data converting means for converting the digital data which is generated from said relay means to self-synchronous type data; and an output terminal to generate said self-synchronous type data to an external apparatus, wherein when said disc identification signal indicates said second optical disc and there is a designation from said designating means, said relay means forcedly relays and generates the output of said data extracting means.

* * * * *